United States Patent
King et al.

(10) Patent No.: US 10,322,524 B2
(45) Date of Patent: Jun. 18, 2019

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US); David L. Malotky, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 19 days.

(21) Appl. No.: 15/537,250

(22) PCT Filed: Jun. 30, 2015

(86) PCT No.: PCT/US2015/038479
§ 371 (c)(1),
(2) Date: Jun. 16, 2017

(87) PCT Pub. No.: WO2016/105597
PCT Pub. Date: Jun. 30, 2016

(65) Prior Publication Data
US 2017/0355097 A1    Dec. 14, 2017

Related U.S. Application Data

(60) Provisional application No. 62/096,042, filed on Dec. 23, 2014.

(51) Int. Cl.
| | |
|---|---|
| *B27K 3/15* | (2006.01) |
| *C08K 5/00* | (2006.01) |
| *C08K 5/17* | (2006.01) |
| *C08L 33/12* | (2006.01) |
| *C08L 97/02* | (2006.01) |
| *C08K 3/10* | (2018.01) |
| *C08K 5/1515* | (2006.01) |
| *C08L 33/08* | (2006.01) |
| *C08L 33/10* | (2006.01) |
| *C08L 33/14* | (2006.01) |

(52) U.S. Cl.
CPC ............... *B27K 3/15* (2013.01); *B27K 3/153* (2013.01); *C08K 5/0025* (2013.01); *C08K 5/17* (2013.01); *C08L 33/12* (2013.01); *C08L 97/02* (2013.01); *B27K 2240/70* (2013.01); *C08K 3/10* (2013.01); *C08K 5/1515* (2013.01); *C08L 33/08* (2013.01); *C08L 33/10* (2013.01); *C08L 33/14* (2013.01)

(58) Field of Classification Search
CPC ....................................................... B29K 3/00
See application file for complete search history.

(56) References Cited

U.S. PATENT DOCUMENTS

| | | | |
|---|---|---|---|
| 3,891,470 A * | 6/1975 | Kotone | C23F 11/02 106/14.05 |
| 5,338,345 A | 8/1994 | Scarborough et al. | |
| 6,843,837 B2 * | 1/2005 | Zhang | A01N 59/20 106/18.32 |
| 7,482,395 B2 | 1/2009 | Mabey et al. | |
| 7,632,567 B1 * | 12/2009 | Zhang | A01N 59/16 106/18.32 |
| 8,119,729 B2 | 2/2012 | Munzmay et al. | |
| 2003/0023570 A1 | 1/2003 | Kobayashi et al. | |
| 2003/0150358 A1 | 8/2003 | Fahrenkopf | |
| 2007/0131136 A1 * | 6/2007 | Zhang | A61K 31/33 106/15.05 |
| 2007/0154505 A1 * | 7/2007 | Manico | A01N 59/16 424/405 |
| 2008/0072791 A1 * | 3/2008 | Ashmore | B27K 3/0292 106/287.18 |
| 2008/0214766 A1 | 9/2008 | Munzmay et al. | |

FOREIGN PATENT DOCUMENTS

| | | | | |
|---|---|---|---|---|
| EP | 1216801 B1 | 6/2005 | | |
| GB | 1188466 A * | 4/1970 | | B27K 3/02 |
| GB | 1188466 A | 4/1970 | | |
| WO | 2001090265 | 11/2001 | | |
| WO | 2005005566 | 1/2005 | | |
| WO | 2012003004 | 1/2012 | | |
| WO | 2012156172 | 11/2012 | | |
| WO | 2013117511 | 8/2013 | | |

* cited by examiner

*Primary Examiner* — Cachet I Sellman

(57) ABSTRACT

A treated cellulosic material comprising a cellulosic material having a porous structure defining a plurality of pores, at least a portion of the pores containing a treating agent comprising a polymer comprising a poly(meth)acrylate polymer. The present further describes a method for preparing a treated cellulosic material comprising (a) providing a cellulosic material; and (b) a first treatment protocol comprising impregnating the cellulosic material with an aqueous dispersion comprising a polymer, the polymer comprising a poly(meth)acrylate polymer.

2 Claims, No Drawings

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that add water resistance and improve the dimensional stability of the cellulosic material are of interest. Wood is capable of absorbing as much as 100% of its weight in water which causes the wood to swell, which, after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus.

Termites are one of the most significant insect groups responsible for wood damage. In order to mitigate termite damage, the use of naturally durable wood species, preservative treatments, and engineered wood products have been employed. However, the need for improved technologies for termite resistance are desirable due to the limited availability of durable woods, the high percentage weight gains required for preservatives to provide efficacy, and the "unnatural" look of engineered wood. A technology which is provides termite resistance and dimensional stability to wood is highly desirable.

Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a polymer comprising a poly(meth)acrylate polymer.

The present disclosure further describes a method for preparing a treated cellulosic material comprising (a) providing a cellulosic material; and (b) a first treatment protocol comprising impregnating the cellulosic material with an aqueous dispersion comprising a polymer, the polymer comprising a poly(meth)acrylate polymer.

DETAILED DESCRIPTION OF THE INVENTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

A "treated cellulosic material" is a cellulosic material that has been treated with a treating agent to modify the properties of the cellulosic material. The properties modified by the treating agent include, but are not limited to, increased hydrophobicity, dimensional stability, fungi resistance, mold resistance, insect resistance, hardness, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises a polymer. In one instance, the treating agent comprises both a polymer and a modifying agent. The treating agent is applied to the cellulosic material. One method of applying the treating agent to the cellulosic material is through impregnation using pressure treatment. In one instance, the polymer is applied to the cellulosic material as part of a dispersion. Other methods of applying the treating agent are known, such as brushing, coating, spraying, dipping, soaking and extrusion. Once applied, the treating agent will permeate at least a portion of the pores of the cellulosic material.

As used herein, the term "polymer" refers to a molecule that is formed from one or more types of monomers. The polymer may be a polymer or a copolymer. As used herein, the term "copolymer" may refer to an alternating copolymer, a periodic copolymer, a statistical copolymer, a random copolymer, a block copolymer, a graft copolymer, or other copolymer as is known. As used herein, copolymer refers to a polymer formed by uniting two or more monomers. Examples of copolymers include bipolymers, terpolymers, tetrapolymers, and other higher-ordered copolymers. In one instance, the polymer comprises a (meth)acrylate polymer (also referred to herein as poly(meth)acrylate). In one instance, the poly(meth)acrylate polymer is formed using one or more monomers, for example, acrylic acid and its derivatives, including methacrylic acid, methyl acrylate, ethyl acrylate, butyl acrylate, methyl methacrylate, ethyl methacrylate, butyl methacrylate, 2-ethylhexyl acrylate, hydroxyethyl acrylate, and hydroxyethyl methacrylate. Additional unsaturated monomers such as styrene and styrene derivative monomers may be added to form poly(meth)acrylate/styrene copolymers.

As used herein, the use of the term "(meth)" followed by another term such as acrylate refers to both acrylates and methacrylates. For example, the term "(meth)acrylate" refers to either an acrylate or methacrylate; the term "(meth)acrylic" refers to either acrylic or methacrylic acid.

In one instance, the polymer comprises a copolymer wherein one of the monomers is hydrophobic. In one instance, the polymer comprises a copolymer wherein one of the monomers is hydrophilic. In one instance, the polymer comprises a copolymer containing one or more hydrophobic monomers and one or more hydrophilic monomers. In one instance the hydrophobic monomer is a (meth)acrylate monomer, for example, butyl acrylate, 2-ethylhexyl acrylate, or butyl methacrylate. In one instance the hydrophobic monomer is a styrene monomer. In one instance the hydrophilic monomer is a (meth)acrylic acid monomer. In one instance the polymer comprises a (meth)acrylic acid/styrene copolymer. In one instance, the polymer comprises a (meth)acrylic acid/(meth)acrylate copolymer. In one instance the polymer comprises a (meth)acrylate/styrene/(meth)acrylic acid copolymer. In one instance the copolymer comprises 10 weight percent or more of acrylic acid. In one instance the polymer is formed from one or more monomers which are derivatives of acrylic acid. In one instance the polymer is formed from one or more monomers which are derivatives of styrene. Examples of styrene and styrene derivative monomers suitable for use in the poly(meth)acrylate/styrene copolymer include 2-methylstyrene, 4-methylstyrene, 4-t-butylstyrene, divinyl benzene, styrene, 4-t-butoxystyrene, 4-nitrostyrene, and 4-vinylbenzoic acid.

In one instance, the polymer is a constituent part of an aqueous dispersion. In one instance, the dispersion is a medium that comprises the polymer and a neutralizing agent. The neutralizing agent, as described in greater detail herein, is selected to neutralize at least a portion of the carboxlic acid substituents of the poly(meth)acrylic polymer. In one instance, the dispersion includes a surfactant. The aqueous dispersion is prepared such that the suspended particle size in the dispersion is suitable for penetrating the pores of the cellulosic material for distribution through the cellulosic material, for example having a particle size of 5-50,000 nm, more preferably 5-500 nm. In one instance, the dispersion also comprises one or more additives. In one instance, any solids present in the aqueous dispersion are held in a stable suspension and are transportable by the dispersion into the pores of the cellulosic material. A stable dispersion is a dispersion that, once formed, resists change in its properties over time and is therefore suitable for penetrating the pores of the cellulosic material. In one instance, the solid content of the dispersion is 1 to 75 weight percent.

In one instance the dispersion includes a solvent. In one instance the solvent contains water. In one instance the solvent is an organic solvent. In one instance the organic solvent is an oxygenated solvent, a hydrocarbon solvent, a halogenated solvent, or a combination thereof.

The carboxylic acid portion of the polymer is neutralized with a neutralizing agent at least in part to form a stable aqueous dispersion. As used herein, a neutralizing agent is any material in which the reaction with the carboxylic acid can potentially result in the formation of a salt. In one instance the neutralizing agent is selected from the hydroxides of alkali metals, ammonia or organic derivatives thereof (including amines). In one instance the neutralizing agent is a base. For example, the neutralizing agent may be sodium hydroxide, potassium hydroxide, or ammonia or an amine, such as monoethanolamine (MEA), triethanolamine (TEA), phenethylamine (PEA), dimethylaminoethanol (DMEA), or polyamine such as polyethylenimine (PEI). The neutralizing agent neutralizes at least a portion of the carboxylic acid groups of the polymer. As used herein, neutralization of the carboxylic acid groups refers to any reaction in which the hydrogen of the carboxylic acid group is transferred. In one instance, 5 to 100 mole percent of the carboxylic acid groups of the polymer are neutralized by the neutralizing agent. In another instance 50 to 100 mole percent of the carboxylic acid groups are neutralized by the neutralizing agent. In still another instance 90 to 100 mole percent of the carboxylic acid groups are neutralized by the neutralizing agent.

In one instance the treating agent comprises a poly(meth)acrylate/styrene copolymer and a modifying agent. In one instance the treating agent comprises a poly(meth)acrylate/styrene copolymer without a modifying agent. The "modifying agent" is a substance that, when combined with the polymer modifies at least a portion of the carboxylic acid groups of the polymer. The modifying agent may modify the polymer in a variety of ways, for example, by crosslinking the polymer, by neutralizing the carboxylic acid portion of the polymer, or by adding hydrophobic properties to the polymer. In one instance, the modifying agent is a hydrophobic amine, for example, a primary, a secondary or a tertiary amine. In one instance, the modifying agent is a hydrophobic amine salt. In one instance the hydrophobic amine contains only one amino group. The hydrophobic amine may be any suitable amine, such as a linear amine, a branched aliphatic amine, a cyclic amine, an aromatic amine, or a mixture thereof. The amine is selected such that the viscosity is low enough to penetrate the pores of the cellulosic material and contains six or more carbon atoms to provide sufficient hydrophobicity. In the case of highly viscous amines or solid amines, a solvent may be used, for example, water, oxygenated solvents, halogenated solvents, aromatic solvents, hydrocarbons, or a mixture thereof. Examples of hydrophobic amines include N-methyl N-hexyl amine, N,N-diethyl n-hexylamine, n-octyl amine, n-decyl amine n-dodecyl amine, N-methyl cyclohexylamine, N,N,-diethyl cyclohexylamine, dicyclohexylamine, benzyl amine, coco amine, oleyl amine, stearyl amine, and the N,N-dimethyl substituted fatty amines. In one example, the modifying agent is phenethylamine or tallow amine.

In one instance, the modifying agent comprises a polyamine having greater than or equal to 2 amine groups. In one instance, the modifying agent crosslinks at least a portion of the polymer. In one instance, the modifying agent is a diamine, a triamine, a higher-order polyamine or a mixture thereof. Suitable modifying agents include polyamines formed from the reductive amination of monoethanolamine (commonly known as ethyleneamines) or monoisopropanolamine (commonly known as propyleneamines). Other examples of suitable modifying agents include triaminononane (4-aminomethyl-1,8-octanediamine), hexamethylenediamine, 1,3-diaminopropane, 1,4 diaminobutane, 1,5 diaminopentane, bis(3-aminopropyl) amine, 1,3-pentanediamine, 2-methylpentamethylenediamine, bis(hexamethylene)triamine, 1,2-diaminocyclohexane, polyethyleneimines (PEIs) or a mixture thereof.

In one instance, the modifying agent comprises a bivalent, trivalent, or tetravalent metal ion, or a mixture thereof. In one instance, the modifying agent interacts with at least a portion of the polymer such that, without being limited by theory, the modifying agent at least partially impedes the polymer from leaching out of the cellulosic material. In one instance, the modifying agent is capable of forming a stable dispersion in water. In one instance, the modifying agent is capable of crosslinking the polymer. Examples of suitable bivalent metal ions include $Ca^{2+}$, $Zn^{2+}$, $Mg^{2+}$, $Ba^{2+}$, $Fe^{2+}$, $Cu^{2+}$, $Sn^{2+}$, $S^{2+}$, and $Ni^{2+}$, or a mixture thereof. Example of suitable trivalent metal ions include $Fe^{3+}$, $B^{3+}$, $P^{3+}$, $Al^{3+}$, $Cu^{3+}$, $La^{3+}$, $Y^{3+}$, and $Ga^{3+}$, or a mixture thereof. Examples of suitable tetravalent metal ions include $Si^{4+}$, $S^{4+}$, $Ti^{4+}$, $Zr^{4+}$, $Sn^{4+}$, $Ce^{4+}$, and $Hf^{4+}$, or a mixture thereof.

In one instance, the modifying agent is a quaternary ammonium compound comprising a quaternary ammonium cation and an anion, and is referred to herein as a "quat." Examples of suitable quaternary ammonium compounds include but are not limited to, those having the formula $R^1R^2R^3R^4N^+X$ where $R^1$, $R^2$, $R^3$, and $R^4$ independently are saturated or unsaturated carbon substituents which are linear, branched, cyclic or any combination thereof and X is an anion. The sum of the number of carbon atoms in $R^1$, $R^2$, $R^3$, and $R^4$ broadly ranges from about 8 to 50. $R^1$, $R^2$, $R^3$, and $R^4$ may be, for example, alkyl, alkenyl, alkynyl, cycloalkyl, aryl, or any combination of these, and the anion X may be, for example, chloride, bromide, iodide, borate, carbonate, bicarbonate, nitrite, or a carboxylate such as acetate, laurate or stearate. Examples of suitable modifying agents include trimethyl soya alkyl ammonium chloride, or an alkyl trimethyl ammonium chloride/bromide (where the alkyl can be C12, C16, C18, C12, Coco, palmacyl), or a dialkyl dimethyl ammonium chloride/bromide (where the alkyl can be —C8, C10, C12, C16, C18, Hydrogenated Tallow), or an alkyl dimethyl benzyl ammonium chloride/bromide (where the alkyl can be C12, C14, C16, C18, Coco), or a mixture thereof.

In one instance, the modifying agent is an epoxy resin. In one instance, the epoxy resin is provided as a liquid in a solution with one or more solvents. In another instance the epoxy resin is provided as a solid suspended in a dispersion (referred to herein as an epoxy dispersion). Epoxy resins are those compounds containing at least one vicinal epoxy group. The epoxy resin may be saturated or unsaturated, aliphatic, cycloaliphatic, aromatic or heterocyclic. The epoxy resin may be substituted. The epoxy resin may also be monomeric or polymeric. The epoxy resin useful in the present invention may be selected from any known epoxy resins in the art. Examples of suitable epoxy resins include, but are not limited to, polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, and mixtures thereof. Particularly suitable epoxy resins are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins include reaction products of epichlorohydrin with o-cresol and, respectively, phenol novolacs. It is also possible to use a mixture of two or more epoxy resins. The epoxy resins, used in embodiments disclosed herein, may vary and include conventional and commercially available epoxy resins, which may be used alone or in combinations of two or more. For example, D.E.R. 330, D.E.R. 331, D.E.R.332, D.E.R. 334, D.E.R. 354. D.E.R. 383, D.E.R. 580, D.E.N. 431, D.E.N. 438, D.E.R. 736, or D.E.R. 732 epoxy resins available from The Dow Chemical Company may be used. In addition, waterborne dispersions of solid or liquid epoxy resins such as those available under the trademark OUDRASperse™, commercially available from The Dow Chemical Company, e.g., OUDRASperse™ WB 3001, OUDRASperse™ WB 4001, OUDRASperse™ WB 6001, may be used. Mixtures of epoxy resins may also be used. In one instance, the epoxy resin comprises any aromatic or aliphatic glycidyl ether or glycidyl amine or a cycloaliphatic epoxy resin. However, diglycidyl ether of bisphenol A and derivatives thereof are particularly preferred. Other epoxy resins can be selected from, but limited to, the groups of: bisphenol F epoxy resins, novolac epoxy resins, glycidylamine-based epoxy resins, alicyclic epoxy resins, linear aliphatic epoxy resins, tetrabromobisphenol A epoxy resins, and combinations thereof. Suitable modifying agents include 2,2-Bis(p-(2,3-epoxypropoxy)phenyl)propane. Suitable epoxy dispersions include water and Bisphenol A diglycidyl ether. The epoxy dispersion is prepared such that the suspended particle size in the dispersion is suitable for penetrating the pores of the cellulosic material for distribution through the cellulosic material.

The treating agent is combined with the cellulosic material. In one instance, the treating agent is introduced to the cellulosic material by pressure treatment, as described herein. In another instance, the treating agent is introduced to the cellulosic material by other techniques known in the art, for example, brushing, coating, dipping, soaking, spraying, and extrusion. The treating agent becomes impregnated in at least a portion of the pores of the cellulosic material, and thereby increases the weight of the cellulosic material. In one instance, the polymer increases the weight of the cellulosic material by 1 to 80 percent (as calculated after drying the cellulosic material for at least 2 hours at or above 60° C.). In one instance, the treating agent increases the weight of the cellulosic material by 5 to greater than 100 percent (as calculated after drying the cellulosic material for at least 2 hours at or above 60° C.).

In one instance, the treating agent comprises one or more additives. The additive may be included as part of the dispersion, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is a material which improves the wetting or penetration of the polymer into the wood, for example, solvents or surfactants (anionic, cationic or nonionic) that are stable in the dispersion. Examples of additives include solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and antifoaming agents. Such waxes may include petroleum waxes, paraffin waxes, a natural wax, or a synthetic wax such as polyethylene wax or oxidized polyethylene wax, beeswax, or slack wax. In addition, the treating agent may be used in conjunction with wood preservatives containing, for example, cupric-ammonia, cupric-amine, cupric-ammoniaamine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, fungicides, and moldicides may be added to the treating agent. In one instance, the additive is included as part of the dispersion and forms a stable suspension therewith. In one instance, one or more surfactant is added to the dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. For example, an anionic surfactant is DOWFAX™ C10 L, commercially available from The Dow Chemical Company. Examples of cationic surfactants include alkyltrimethylammonium salts.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent.

In one instance, the treated cellulosic material is prepared according to at least a first treatment protocol and a second treatment protocol. In one instance, the first treatment protocol comprises impregnating the cellulosic material with the polymer. The first treatment protocol comprises one or more of the following steps: (a) depositing the cellulosic material in a vessel; (b) holding the vessel at vacuum for 5 to 60 minutes; (c) introducing the polymer to the vessel; (d) pressurizing the vessel to 1.03 MPa for 5 to 60 minutes; (e) draining the excess polymer; (f) optionally removing excess polymer by vacuum and (g) drying the cellulosic material at 20 to 60° C. for 24 to 48 hours. In one instance, the polymer is part of the aqueous dispersion.

In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) drying the cellulosic material at 60° C. for 24 to 48 hours.

In one instance, the product of the second treatment protocol is subsequently neutralized according to a neutralization protocol that neutralizes any residual modifying agent from the second treatment protocol by the use of a modifying agent neutralizer. In one instance, the modifying agent neutralizer is any material suitable for reacting with the modifying agent to reduce its basicity, for example, the dispersion. The neutralization protocol comprises one or more of the following steps: (a) depositing the cellulosic material prepared according to the second treatment protocol in a vessel; (b) introducing the modifying agent neutralizer to the vessel for 30 minutes; and (c) drying the cellulosic material at 60° C. for 24 to 48 hours.

The designations "first treatment protocol" and "second treatment protocol" are not meant to be read as defining a treatment order. It is envisioned that the cellulosic material may be treated first with the dispersion and second treated with the modifying agent, whereby the second treatment follows the first treatment in time. It is also envisioned that the cellulosic material may be treated first with the modifying agent and second treated with the dispersion, whereby the second treatment protocol precedes the first treatment protocol in time. In the preferred embodiment, the first treatment protocol precedes the second treatment protocol.

The several drying steps may be performed at a range of temperatures, whereby the duration of the drying step is proportional to the temperature. Suitable drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising an untreated cellulosic material; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of the control untreated wood is 0%.

The hardness of the treated cellulosic material is determined according to the Shore (Durometer) test using a Type D Durometer (30° cone, 1.40 mm diameter, 2.54 mm extension, 44.48N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated southern yellow pine control wafer is approximately 40.

The following Examples illustrate certain aspects of the present disclosure, but the scope of the present disclosure is not limited to the following Examples.

All the vacuum operations in the examples are in the range of −0.00399 MPa to −0.00267 MPa.

EXAMPLE 1

ACCUDYNE™ 1000 (an acrylate/hydroxyester acrylate copolymer manufactured by The Dow Chemical Company) is firstly modified by monoethanol amine to reduce the particle size. 1,930 g of deionized water is loaded while the reactor is heating to 90 C. This is followed by 1,912 g of Acudyne 1000 and 158 g of monoethanol amine. The reaction between ACCUDYNE 1000 and monoethanol amine is conducted for 2 hours at temperature 90 C, and at 5 hours the system is cooled to 60 C while mixing. The modified ACCUDYNE 1000 has a pH of 6.27 and particle size of 108 nm.

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 24 percent by weight modified ACCUDYNE™ 1000 and 76 percent by weight water is introduced to the reactor. The reactor pressure is then set to 1.03 MPa for 60 minutes under nitrogen. The wafer is then placed in an oven and dried in air at 60° C. for 48 hours. The wafer is placed back into the reactor, and held in place by the weight. The reactor is filled with sufficient phenethylamine (PEA) to submerge the wafer. The reactor pressure is set to vacuum for 60 minutes. The wafer is then placed in an oven and dried in air at 60° C. for 48 hours, thereby providing a treated wafer. The treated wafer and a control wafer are each processed according to the E4-11 procedure. The percent swelling for the treated wafer is 0.45%; the WRE of the treated wafer is 92%. The hardness of the treated wafer is measured as 57 using a Type D Durometer.

EXAMPLE 2

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent by weight of a styrene/acrylic/acrylate copolymer (52.3% butyl acrylate/32.7% styrene/15% acrylic acid, Tg~10° C., 4.7 pH, particle size of 164 nm) and 80 percent by weight water is introduced to the reactor. The styrene/acrylic/acrylate aqueous dispersion is synthesized based on AQUASET LT™ technology. The reactor pressure is then set to 1.03 MPa for 60 minutes under nitrogen. The wafer is then placed in an oven and dried in air at 60° C. for 48 hours, thereby providing a treated wafer. The treated wafer and a control wafer are each processed according to the E4-11 procedure. The percent swelling for the treated wafer is 1.86%; the WRE of the treated wafer is 60.4%. The hardness of the treated wafer is measured as 48.8 using a Type D Durometer.

EXAMPLE 3

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent by weight of a styrene/acrylic/acrylate copolymer (52.3% butyl acrylate/32.7% styrene/15% acrylic acid, Tg~10° C., with 0.5 equivalents of PEA based on acrylic acid content added to neutralize the styrene/acrylic/acrylate copolymer dispersion to a pH of 6.8, particle size of 181 nm) and 80 percent by weight water is introduced to the reactor. The styrene/acrylic latexes aqueous dispersions are synthesized based on AQUASET LT™ technology. The reactor pressure is then set to 1.03 MPa for 60 minutes under nitrogen. The wafer is then placed in an oven and dried in air at 60° C. for 48 hours, thereby providing a treated wafer. The treated wafer and a control wafer are each processed according to the E4-11 procedure. The percent swelling for the treated wafer is 1.5%; the WRE of the treated wafer is 64.5%. The hardness of the treated wafer is measured as 46.3 using a Type D Durometer.

The Examples illustrate that when the cellulosic material is treated with the treating agent favorable WRE results are obtained compared to the cellulosic material which does not contain a treating agent. Example 2 shows favorable results by using a polymer synthesized using hydrophobic monomers butyl acrylate and styrene. Further, when this material is neutralized with a hydrophobic amine as in Example 3, the percent swelling and the WRE are improved compared to the same material which is not neutralized by a hydrophobic amine.

What is claimed is:
1. A method for preparing a treated cellulosic material comprising:
  (a) providing a cellulosic material;
  (b) a first treatment protocol comprising impregnating the cellulosic material with an aqueous dispersion comprising a polymer, the polymer comprising a poly(meth)acrylate polymer; and
  (c) a second treatment protocol comprising impregnating the cellulosic material with a modifying agent, the modifying agent comprising a hydrophobic amine, and wherein the modifying agent comprises N-methyl N-hexyl amine; N,N-diethyl n-hexylamine; n-octyl amine; n-decyl amine n-dodecyl amine; N-methyl cyclohexylamine; N,N,-diethyl cyclohexylamine; dicyclohexylamine; benzyl amine; coco amine; oleyl amine; stearyl amine; or the N, N-dimethyl substituted fatty amine; or a mixture thereof.
2. The method of claim 1, wherein the impregnating of the first treatment protocol is conducted under pressure greater than or lower than ambient.

* * * * *